3,018,154
COLORED AROMATIC POLYESTER MATERIAL AND PROCESS OF MAKING SAME

John F. Downey, Cheektowaga, and Robert C. Hoare, Hamburg, N.Y., assignors to Allied Chemical Corporation, New York, N.Y., a corporation of New York
No Drawing. Filed Sept. 24, 1959, Ser. No. 841,937
13 Claims. (Cl. 8—55)

This invention relates to colored aromatic polyester material of the polyalkylene terephthalate type and to processes for coloring said material. It relates more particularly (1) to colored material of said type, and especially dyed polyethylene terephthalate fibers, which possess outstanding fastness to light and to washing, and (2) to processes of obtaining them.

Aromatic polyester material of the type under consideration consists of highly polymeric linear esters obtainable by reacting glycols of the series $HO(CH_2)_nOH$—$n$ being an integer from 2 to 10—with terephthalic acid or an ester-forming derivative thereof under polymer-forming conditions. Examples of such material are the highly polymeric linear polyesters obtainable from terephthalic acid or ester-forming derivatives thereof and ethylene glycol, trimethylene glycol, tetramethylene glycol, hexamethylene glycol and decamethylene glycol, in the form of fibers, foils, fabrics, etc., and especially polyethylene terephthalate fiber (such as the fibers sold under the trademarks "Dacron," "Terylene" and "Kodel," in the form of filaments, yarn, and various textile forms) which is particularly of importance in view of its ready availability and outstanding utility as a textile material. A method of producing polyethylene terephthalate fiber is disclosed in U.S.P. 2,465,319 to Winfield and Dickens.

Aromatic polyester fibers of the polyalkylene terephthalate type are characterized by excellent strength, resistance to creasing, to shrinking and to stretching, and excellent washability. This desirable combination of properties has led to an increasing utilization of fabrics made of or containing such polyester material in the textile and allied industries. This in turn has led to a demand for dyestuffs with which the fibers can be easily dyed and which will give dyeings fast to the combined agencies of light, washing, bleach, etc.

Since the introduction into commerce of fibers of aromatic polyesters of the polyalkylene terephthalate type, much research effort has been devoted to the development of dyes and dyeing processes for the dyeing of yarns and textiles containing such fibers alone or in admixture with other fibers. Said polyester fibers suffer, however, from the disadvantages of having poor affinity for dyestuffs and of not readily absorbing aqueous liquids; so that most of the known dyeing procedures previously developed for the coloring of synthetic fibers are not suitable for the application of the known dyestuffs to said aromatic polyester material and especially to polyethylene terephthalate fibers. For example, the known class of dispersed dyes, which had been developed for use in dyeing cellulose acetate and which were found to have affinity for polyethylene terephthalate fiber, could not be applied by the known dyeing procedures; special dyeing methods, including more elevated temperatures, and the use of special dyeing assistants were required. Even so, the dyeings obtained with such known dyestuffs by such special methods were fugitive to light and/or possessed poor fastness in other respects. Other expedients attempted with known dyestuff were the use of relatively expensive equipment and bizarre dyeing compositions or methods; but such expedients were unsatisfactory.

An object of the present invention is to provide coloring agents for aromatic polyester material of the polyalkylene terephthalate type which color said material in bright shades possessing good fastness properties.

A further object of the present invention is to provide a class of dyestuffs which dye polyethylene terephthalate fiber shades which are characterized by outstanding fastness to light.

Another object of the present invention is to provide a class of dyestuffs for polyethylene terephthalate fiber which dye said fiber bright shades possessing excellent fastness properties.

Another object of the present invention is to provide a class of dyestuffs for dyeing aromatic polyester material of the polyethylene terephthalate type, which dyestuffs can be readily applied by the known dyeing procedures and produce dyed material having outstanding fastness to light. (As employed herein the term "dyeing" includes various dyeing and printing procedures, and the term "dyed" includes colored material produced by dyeing and printing procedures.)

An additional object of the present invention is to provide new compounds useful for the above purposes.

Other objects of the present invention in part will be obvious and in part will appear hereinafter.

According to the present invention, aromatic polyester material of the polyalkylene terephthalate type is colored by means of certain anthraquinone monoarylthioethers set out more fully below.

We have discovered that the anthraquinone monoarylthioethers set out more fully below are exceptional coloring agents for aromatic polyester material of the polyalkylene terephthalate type and particularly for the dyeing of polyethylene terephthalate fibers. Thus, we have found that said anthraquinone mono-arylthioethers dye said aromatic polyester material readily and evenly, and that the resulting dyed material possesses excellent fastness properties.

We have further discovered a number of new compounds within said class of anthraquinone mono-arylthioethers, which compounds have outstanding utility for the coloring of said aromatic polyester material.

The anthraquinone mono-arylthioethers employed as coloring agents in accordance with the present invention are selected from the group consisting of α-mono-arylthioethers having the formula

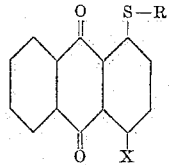

and β-mono-arylthioethers having the formula

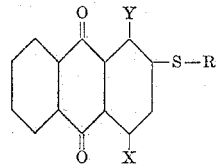

wherein

R represents a mononuclear aryl radical, more particularly a mononuclear aryl hydrocarbon radical (such as, phenyl, o-tolyl, m-tolyl, p-tolyl, or xylyl) or a nitro derivative thereof (such as, o-nitrophenyl, m-nitrophenyl or p-nitrophenyl), or an amino derivative thereof (such as, o-aminophenyl, m-aminophenyl or p-aminophenyl), X represents a member selected from the group consisting of H, OH and lower alkoxy (such as, methoxy, ethoxy, propoxy, butoxy or amoxy), and Y represents a member selected from the group consisting of H and $NH_2$.

The coloring, and particularly the dyeing and printing, of polyethylene terephthalate fiber and other aromatic polyester material of the polyalkylene terephthalate type can be carried out by any of the methods heretofore known for the coloring of such material. It is a feature of the present invention that the anthraquinone mono-arylthioethers employed in accordance with the present invention for the coloring of the aromatic polyester material do not require any special dyeing or printing techniques for their successful application to said material. The said anthraquinone mono-arylthioethers are water-insoluble; accordingly they are applied from aqueous dispersions in the manner of the so-called "dispersed dyes." Thus, they may be applied by the various methods heretofore described as useful for the application to said aromatic polyester material of the water-insoluble dyes normally used for the dyeing and printing of cellulose acetate; for example,

U.S.P. 2,833,613;

"Principles of Dyeing 'Dacron' Polyester Fiber," in American Dyestuff Reporter 41 (1952), 860;

"'Thermosol' Method of Dyeing" in American Dyestuff Reporter 42 (1953), 1; and

"Dyeing of 'Dacron' Polyester Fiber—Evaluation of Dyeing Assistants," in Du Pont Technical Bulletin, volume 8, No. 2 (June 1952), p. 69.

For instance, the dyeing of textile fibrous material formed of terephthalate polyesters of the type under consideration is advantageously carried out by working the fibrous material in a dyebath containing an aqueous dispersion of the anthraquinone mono-arylthioether, and preferably also containing a dyeing assistant (such as phenol, ortho-phenylphenol, chlorobenzene, benzoic acid, salicylic acid, or mixtures thereof). The dyeing operation is carried out at about 80° to 115° C. and preferably at the boiling temperature or above. By using a closed apparatus, the dyeing can be carried out at superatmospheric pressures and at temperatures above the boiling point at atmospheric pressure.

In preparing the dyebath, the anthraquinone mono-arylthioethers are dispersed by any suitable means known for the dispersion of dyes used for dyeing cellulose acetate. Thus, they are generally worked up into an aqueous paste with the aid of a dispersing agent or mixture of dispersing agents (such as, sodium lignin sulfonate or similar sulfite cellulose waste liquor product, formaldehyde condensation products of alkyl naphthalene sulfonates, formaldehyde condensation products of β-naphthalene sulfonate, polymerized formaldehyde naphthalene sodium sulfonate, etc.). It is usually advantageous to use a mixture of dispersing agents, since no one agent has the desired combination of properties (wetting, dispersing, etc.) which can be obtained by using a suitable mixture. The dispersion is then added to the dyebath, which may or may not contain a dyeing assistant, and the material to be dyed is then entered into the dyebath and worked in the usual manner.

The amount of coloring agent employed will depend upon the depth of coloring desired to be obtained. For example, in the dyeing of polyethylene terephthalate fiber, amounts of the anthraquinone mono-arylthioether ranging from 0.025% to 2.5% of the weight of the fiber may be employed for the dyeing of pastel to heavy shades.

The anthraquinone mono-arylthioethers employed as coloring agents in accordance with the present invention can be obtained in various ways, a number of which are known. For example, a suitable anthraquinone compound having a replaceable substituent in the alpha- or beta-position into which the arylthioether radical is to be introduced can be condensed with a suitable thiophenol. The condensation can be effected, for example, by heating in an alcoholic reaction medium (such as methanol, ethanol, isopropanol, isobutanol, n-butanol, diethylene glycol monoethyl ether ("Carbitol"), ethylene glycol monoethyl ether ("Cellosolve") or mixtures thereof) which also contains an acid-binding agent (such as, sodium hydroxide, potassium hydroxide, sodium carbonate, pyridine, N,N-diethylaniline or mixtures thereof), and the resulting anthraquinone mono-arylthioether can be recovered, for example by filtering off the anthraquinone mono-arylthioether which separates out of solution from the alcoholic reaction medium as it is formed.

Thus, the anthraquinone mono-arylthioethers can be prepared by mixing about 1 mol of 1-chloroanthraquinone (or 1-bromoanthraquinone or 1-nitroanthraquinone or the 4-hydroxy derivative of any of them or the 4-lower alkoxy derivative of any of them, or 2-chloroanthraquinone or 2-bromoanthraquinone or 2-nitroanthraquinone or 1-amino-2-chloroanthraquinone or 1-amino-2-bromoanthraquinone or 1-amino-2-nitroanthraquinone or the 4-hydroxy derivative of any of them or the 4-lower alkoxy derivative of any of them) with a sufficient amount of a lower alcohol to give a uniform slurry; adding a solution of 1.0 to 1.5 mols of thiophenol (or o-, m- or p-thiocresol; or a thioxylenol; or o-, m- or p-nitrothiophenol; or o-, m- or p-aminothiophenol) in a lower alcohol which also contains at least 1.05 mol equivalent of potassium hydroxide (or sodium hydroxide or sodium carbonate or potassium carbonate); heating the mixture to boiling, and boiling and refluxing for about 6 hours (or until the reaction is complete); filtering the resulting slurry; washing the filter-cake alkali-free with warm water, and drying in an oven at about 100° C.

Many of the anthraquinone mono-arylthioethers referred to above are new compounds and the invention accordingly includes such compounds as a feature thereof.

Thus, the following are new:

4-hydroxy-1-phenylthioanthraquinone
4-methoxy-1-phenylthioanthraquinone
4-hydroxy-2-phenylthioanthraquinone
4-methoxy-2-phenylthioanthraquinone
1-amino-2-phenylthioanthraquinone
1-amino-4-hydroxy-2-phenylthioanthraquinone
1-amino-4-ethoxy-2-phenylthioanthraquinone
All of the xylylthioanthraquinones referred to above
All of the nitrophenylthioanthraquinones referred to above
All of the aminophenylthioanthraquinones referred to above The invention will be illustrated by the following specific examples, but it is to be understood that it is not limited to the details thereof and that changes may be made without departing from the scope of the invention. The temperatures are in degrees centigrade and the parts and percentages are by weight.

PREPARATION OF ANTHRAQUINONE MONO-ARYLTHIOETHERS

Example 1

To a solution of 16.4 parts of thiophenol and 12.5 parts of potassium hydroxide in 150 parts of denatured alcohol (Formula 2B) was added a mixture of 42.8 parts of 1-amino-2-bromo-4-hydroxy-anthraquinone, 7.7 parts of potassium hydroxide and 400 parts of denatured alcohol (Formula 2B). The mass was heated to and maintained boiling under reflux for 8 hours and then it was cooled to 15°. The resulting slurry was filtered, and the filter cake of 1-amino-4-hydroxy-2-phenylthioanthraquinone was washed alkali-free with warm water, dried in an oven at 100°, and ground to a powder.

When dispersed in the usual manner in an aqueous dyebath, it dyed polyalkylene terephthalate fibers in violet shades of outstanding fastness to light and to washing. When employed similarly as a dispersed dye for cellulose triacetate ("Arnel"), it gave violet shades of excellent resistance to gas fading and to light.

*Example 2*

The procedure of Example 1 was repeated with 20.6 parts of commercial thioxylenol instead of the thiophenol. The resulting mixture of 1-amino-4-hydroxy-2-xylylthio-anthraquinones dyed polyalkylene terephthalate fibers violet shades of outstanding fastness to light and to washing.

*Example 3*

The procedure of Example 1 was repeated with 40.6 parts of 1-amino-2-bromo-anthraquinone instead of 1-amino-2-bromo-4-hydroxy-anthraquinone. The resulting 1-amino-2-phenylthio-anthraquinone dyed polyalkylene terephthalate fibers orange shades of outstanding fastness to light and to washing.

*Example 4*

Polyethylene terephthalate ("Dacron") cloth was dyed with a number of the above anthraquinone mono-arylthioethers by forming an intimately mixed dispersible powder of the following components in the following proportions, and subjecting the cloth to the dyeing procedure set out below:

50 parts anthraquinone-mono-arylthioether
35 parts sodium lignin sulfonate ("Polyfon X TH")
5 parts formaldehyde β-naphthalene sulfonate condensation product ("Tamol N")
10 parts sodium sulfate A dyebath was prepared by bringing a suspension of 10 parts of o-phenylphenol in 500 parts of water to a boil and then adding 0.1 part of the above dispersible powder. "Dacron" cloth (10 parts) was entered into the dyebath, which was then held at the boil for 1 hour with occasional agitation. The cloth was removed, rinsed in cold water and then scoured for 15 minutes at the boil in 400 parts of a 0.2% aqueous solution of a commercial higher alkylbenzene sodium sulfonate detergent ("Nacconol NR"). The dyed material was rinsed in cold water and dried.

The cloth was dyed bright shades having the colors set out in the following Table I.

TABLE I

| Dyestuff | Shade of Dyeing | Fastness to— | |
|---|---|---|---|
| | | Light [1] | Washing [2] |
| 1-Phenylthio-anthraquinone | Yellow | E | E |
| 4 - Hydroxy - 1 - phenylthio - anthraquinone | Orange | E | E |
| 1-Amino - 2 - phenylthio - anthraquinone | Orange | E | E |
| 1-Amino- 4 -hydroxy -2 - phenylthio-anthraquinone | Violet | E | E |
| 1 - Amino - 4 - hydroxy - 2 - xylylthio-anthraquinone | Violet | E | E |

[1] Fastness to light rated as E (Excellent) on the basis of no fading after more than 160 hours' exposure in the Fade-Ometer.
[2] Fastness to washing rated as E (Excellent) on the basis of A.A.T.C.C. Test II.

In place of o-phenylphenol, other dyeing assistants such as chlorobenzene, benzoic acid, salicyclic acid and phenol, can be used with equivalent results.

*Example 5*

For purposes of comparison, the dyeing procedure of Example 4 was repeated with each of the anthraquinone arylthioethers set out in the following Table II. The results are set out in Table II.

TABLE II

| Dyestuff | Shade of Dyeing | Fastness to— | |
|---|---|---|---|
| | | Light | Washing |
| 1 - Amino - 2,4 - bis - phenylthioanthraquinone | Weak Violet | Poor | Poor |
| 1-Amino-4-phenylamino-2-phenylthio-anthraquinone | Blue | Poor | Poor |
| 4 - Methylamino - 1 - phenylthio-anthraquinone | Violet | Poor | Poor |

From the above examples, it is apparent that the anthraquinone mono-arylthioethers employed in accordance with the present invention constitute a group of dyestuffs which color aromatic polyester material of the polyalkylene terephthalate type, and especially polyethylene terephthalate fibers, bright shades having outstanding fastness to light and to washing; whereas other anthraquinone arylthioethers of different structure are not suitable for said purpose.

It will be evident that the invention is not limited to the details of the foregoing illustrative examples and that changes can be made without departing from the scope of the invention.

Thus, mixtures of two or more of the above dyestuffs can be employed to obtain various modified shades. Further, if desired, the above anthraquinone mono-arylthioesters can be employed in admixture with other known dyestuffs for polyester fibers.

Instead of the dyeing procedure employed in the above Example 4, other known procedures for the dyeing, printing or other coloring of aromatic polyester material of the polyalkylene terephthalate type can be employed, several of which have been referred to above. Moreover, various other known dyeing assistants, dispersing agents, swelling agents, and the like heretofore employed in the coloring of such material with other "dispersed dyes" can be employed in conjunction with the anthraquinone mono-arylthioethers herein disclosed.

In addition to their utility as coloring agents for aromatic polyester material of the polyalkylene terephthalate type, the above anthraquinone mono-arylthioethers are also useful as dyes for cellulose acetate, e.g. cellulose triacetate ("Arnel") which they color shades having outstanding resistance to gas fading and to light.

We claim
1. Aromatic polyester material of the polyalkylene terephthalate type colored with an anthraquinone mono-arylthioether selected from the group consisting of α-mono-arylthioethers having the formula

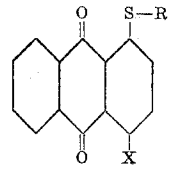

and β-mono-arylthioethers having the formula

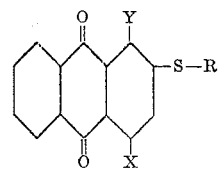

wherein

R represents a mononuclear aryl radical,
X represents a member selected from the group consisting of H, OH and lower alkoxy, and
Y represents a member selected from the group consisting of H and $NH_2$.

2. Polyethylene terephthalate fiber dyed with an anthraquinone mono-arylthioether selected from the group consisting of α-mono-arylthioethers having the formula

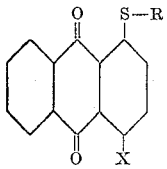

and β-mono-arylthioethers having the formula

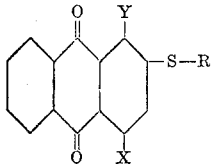

wherein

R represents a mononuclear aryl radical,
X represents a member selected from the group consisting of H, OH and lower alkoxy, and
Y represents a member selected from the group consisting of H and $NH_2$.

3. Polyethylene terephthalate fiber dyed with an anthraquinone mono-arylthioether which is a 1-mononuclear arylthio-anthraquinone.

4. Polyethylene terephthalate fiber dyed with 1-phenylthio-anthraquinone.

5. Polyethylene terephthalate fiber dyed with an anthraquinone mono-arylthioether which is a 4-hydroxy-1-mononuclear arylthio-anthraquinone.

6. Polyethylene terephthalate fiber dyed with 4-hydroxy-1-phenylthio-anthraquinone.

7. Polyethylene terephthalate fiber dyed with an anthraquinone mono-arylthioether which is a 1-amino-2-mononuclear arylthio-anthraquinone.

8. Polyethylene terephthalate fiber dyed with 1-amino-2-phenylthio-anthraquinone.

9. Polyethylene terephthalate fiber dyed with an anthraquinone mono-arylthioether which is a 1-amino-4-hydroxy-2-mononuclear arylthio-anthraquinone.

10. Polyethylene terephthalate fiber dyed with 1-amino-4-hydroxy-2-phenylthio-anthraquinone.

11. Polyethylene terephthalate fiber dyed with 1-amino-4-hydroxy-2-xylylthio-anthraquinone.

12. A process for coloring an aromatic polyester of the polyalkylene terephthalate type which comprises applying to the polyester an aqueous dispersion of an anthraquinone mono-arylthioether selected from the group defined in claim 1.

13. A process for dyeing polyethylene terephthalate fiber which comprises applying to the fiber an aqueous dispersion of an anthraquinone mono-arylthioether selected from the group defined in claim 1 at about 80 to 115° C.

References Cited in the file of this patent

UNITED STATES PATENTS

| | | |
|---|---|---|
| 1,062,990 | Nawiasky | May 27, 1913 |
| 1,710,992 | Kranzlein | Apr. 30, 1929 |
| 2,109,464 | Cantrell | Mar. 1, 1938 |
| 2,640,061 | Seymour | May 26, 1953 |
| 2,640,062 | Seymour | May 26, 1953 |
| 2,773,071 | Pizzarello | Dec. 4, 1956 |
| 2,807,630 | Jenny | Sept. 24, 1957 |

FOREIGN PATENTS

| | | |
|---|---|---|
| 251,115 | Germany | May 31, 1911 |

OTHER REFERENCES

J.A.C.S., vol. 43, 1921, pp. 2104–2105.